United States Patent
Barreh et al.

(10) Patent No.: US 7,185,178 B1
(45) Date of Patent: Feb. 27, 2007

(54) FETCH SPECULATION IN A MULTITHREADED PROCESSOR

(75) Inventors: Jama I. Barreh, Austin, TX (US); Robert T. Golla, Round Rock, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 293 days.

(21) Appl. No.: 10/881,152

(22) Filed: Jun. 30, 2004

(51) Int. Cl.
- *G06F 7/38* (2006.01)
- *G06F 9/00* (2006.01)
- *G06F 9/44* (2006.01)
- *G06F 15/00* (2006.01)

(52) U.S. Cl. .................... 712/206; 712/218; 712/228; 712/244

(58) Field of Classification Search ............... 712/206, 712/235, 228, 218, 244
See application file for complete search history.

(56) References Cited

U.S. PATENT DOCUMENTS

| | | |
|---|---|---|
| 5,046,068 A | 9/1991 | Kubo et al. |
| 5,257,215 A | 10/1993 | Poon |
| 5,339,266 A | 8/1994 | Hinds et al. |
| 5,353,419 A * | 10/1994 | Touch et al. ............... 712/235 |
| 5,386,375 A | 1/1995 | Smith |
| 5,515,308 A | 5/1996 | Karp et al. |
| 5,546,593 A | 8/1996 | Kimura et al. |
| 5,619,439 A | 4/1997 | Yu et al. |
| 5,954,789 A | 9/1999 | Yu et al. |
| 6,076,157 A | 6/2000 | Borkenhagen et al. |
| 6,088,788 A * | 7/2000 | Borkenhagen et al. ...... 712/205 |
| 6,088,800 A | 7/2000 | Jones et al. |
| 6,105,127 A | 8/2000 | Kimura et al. |
| 6,131,104 A | 10/2000 | Oberman |
| 6,212,544 B1 | 4/2001 | Borkenhagen et al. |
| 6,282,554 B1 | 8/2001 | Abdallah et al. |
| 6,341,347 B1 | 1/2002 | Joy et al. |
| 6,349,319 B1 | 2/2002 | Shankar et al. |
| 6,357,016 B1 | 3/2002 | Rodgers et al. |
| 6,397,239 B2 | 5/2002 | Oberman et al. |

(Continued)

OTHER PUBLICATIONS

Tulsen et al., "Power-sensitive multithreaded architecture," IEEE 2000, pp. 199-206.

(Continued)

*Primary Examiner*—Fritz Fleming
*Assistant Examiner*—Jesse Moll
(74) *Attorney, Agent, or Firm*—Lawrence J. Merkel; Meyertons, Hood, Kivlin, Kowert & Goetzel, P.c.

(57) ABSTRACT

In one embodiment, a processor comprises an instruction cache and a fetch generator circuit coupled thereto. The fetch generator circuit is configured to generate at least one fetch request to the instruction cache for at least one of the plurality of threads. The fetch generator circuit is also configured to monitor for a plurality of conditions for each thread, wherein each of the plurality of conditions defined to inhibit the thread from being fetched. The fetch generator circuit is configured to speculatively generate a first fetch request for a first thread of the plurality of threads if each thread is inhibited from fetching and the first thread is inhibited from fetching only due to a first predetermined condition of the plurality of conditions. In one particular implementation, the first predetermined condition is a lack of room in a corresponding one of a plurality of instruction buffers.

21 Claims, 8 Drawing Sheets

U.S. PATENT DOCUMENTS

| | | |
|---|---|---|
| 6,415,308 B1 | 7/2002 | Dhablania et al. |
| 6,427,196 B1 | 7/2002 | Adiletta et al. |
| 6,434,699 B1 | 8/2002 | Jones et al. |
| 6,496,925 B1 | 12/2002 | Rodgers et al. |
| 6,507,862 B1 | 1/2003 | Joy et al. |
| 6,523,050 B1 | 2/2003 | Dhablania et al. |
| 6,560,693 B1 | 5/2003 | Puzak et al. |
| 6,564,328 B1 | 5/2003 | Grochowski et al. |
| 6,567,839 B1 | 5/2003 | Borkenhagen et al. |
| 6,594,681 B1 | 7/2003 | Prabhu |
| 6,625,654 B1 | 9/2003 | Wolrich et al. |
| 6,629,236 B1 | 9/2003 | Aipperspach et al. |
| 6,629,237 B2 | 9/2003 | Wolrich et al. |
| 6,658,534 B1 | 12/2003 | White et al. |
| 6,668,308 B2 | 12/2003 | Barroso et al. |
| 6,668,317 B1 | 12/2003 | Bernstein et al. |
| 6,671,827 B2 | 12/2003 | Guilford et al. |
| 6,681,345 B1 | 1/2004 | Storino et al. |
| 6,687,838 B2 | 2/2004 | Orenstien et al. |
| 6,694,347 B2 | 2/2004 | Joy et al. |
| 6,694,425 B1 | 2/2004 | Eickemeyer |
| 6,697,935 B1 | 2/2004 | Borkenhagen et al. |
| 6,711,668 B1 | 3/2004 | Wojcieszak et al. |
| 6,728,845 B2 | 4/2004 | Adiletta et al. |
| 6,748,556 B1 | 6/2004 | Storino et al. |
| 6,801,997 B2 | 10/2004 | Joy et al. |
| 6,820,107 B1 | 11/2004 | Kawai et al. |
| 6,847,985 B1 | 1/2005 | Gupta et al. |
| 6,857,064 B2 | 2/2005 | Smith et al. |
| 6,883,107 B2 | 4/2005 | Rodgers et al. |
| 6,889,319 B1 | 5/2005 | Rodgers et al. |
| 6,898,694 B2 | 5/2005 | Kottapalli et al. |
| 2003/0204705 A1* | 10/2003 | Oldfield et al. ............. 712/207 |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

Alverson et al., "Tera Hardware-Software Cooperation," Tera Computer Company, 1997, (16 pages).

Alverson et al., "The Tera Computer System," Tera Computer Company, 1990, (pp. 1-6).

Alverson et al., Exploiting Heterogeneous Parallelism on a Multithreaded Multiprocessor, Tera Computer Company, 1992, (pp. 188-197).

Smith et al., "The End of Architecture," 17th Annual Symposium on Computer Arcitecture, Seattle, Washington, May 29, 1990, (pp. 10-17).

Ungerer et al., "A Survey of Processors with Explicit Multithreading," ACM Computing Surveys, vol. 35, No. 1, Mar. 2003, (pp. 29-63).

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | | | | | | | | |

Fig. 3

Ready = Ready0 & Ready1

Speculative_Ready = !Ready0 & Ready1

FETCH SPECULATION IN A MULTITHREADED PROCESSOR

BACKGROUND

1. Field of the Invention

This invention is related to processors and, more particularly, to instruction fetch mechanisms in processors.

2. Description of the Related Art

The first step for executing instructions in a processor is to fetch the instructions. Most processors include instruction caches to store instructions for rapid fetching. The latency of instruction cache fetches is generally much shorter than the latency of fetching from memory. For example, cache latencies of one to two clock cycles are fairly common, where memory latencies are often measured in hundreds of clock cycles.

Attention has also recently turned to designing multithreaded processors, in which the instructions being executed by the processor at any given time may belong to two or more independent threads. That is, instructions concurrently being processed in the processor's pipeline may belong to different threads. In multithreaded processors, if the instruction cache is shared between two or more threads, a fetch mechanism must be designed to permit the different threads to fetch from the instruction cache.

SUMMARY

In one embodiment, a processor comprises an instruction cache and a fetch generator circuit coupled thereto. The fetch generator circuit is configured to generate at least one fetch request to the instruction cache for at least one of the plurality of threads. The fetch generator circuit is also configured to monitor for a plurality of conditions for each thread, wherein each of the plurality of conditions defined to inhibit the thread from being fetched. The fetch generator circuit is configured to speculatively generate a first fetch request for a first thread of the plurality of threads if each thread is inhibited from fetching and the first thread is inhibited from fetching only due to a first predetermined condition of the plurality of conditions.

In another embodiment, a processor comprises a plurality of instruction buffers and a fetch generator circuit. Each of the plurality of instruction buffers corresponds to a respective thread of a plurality of threads. The fetch generator circuit is configured to generate a first fetch request to fetch at least one instruction from a first thread of the plurality of threads for storage in a first instruction buffer of the plurality of instruction buffers corresponding to the first thread. The fetch generator circuit is configured to generate the first fetch request responsive to: (i) the fetch generator circuit detecting at least one condition for each thread of the plurality of threads that is defined to inhibit the thread from being fetched; and (ii) the first thread being selectable to be fetched except for the condition that a first instruction buffer of the plurality of instruction buffers is unable, in a clock cycle in which the first fetch request is generated, to store at least one instruction to be fetched in response to the first fetch request.

BRIEF DESCRIPTION OF THE DRAWINGS

The following detailed description makes reference to the accompanying drawings, which are now briefly described.

FIG. 3 is a pipeline diagram illustrating one embodiment of a pipeline that may be implemented by the core shown in FIG. 1.

Figure 1:
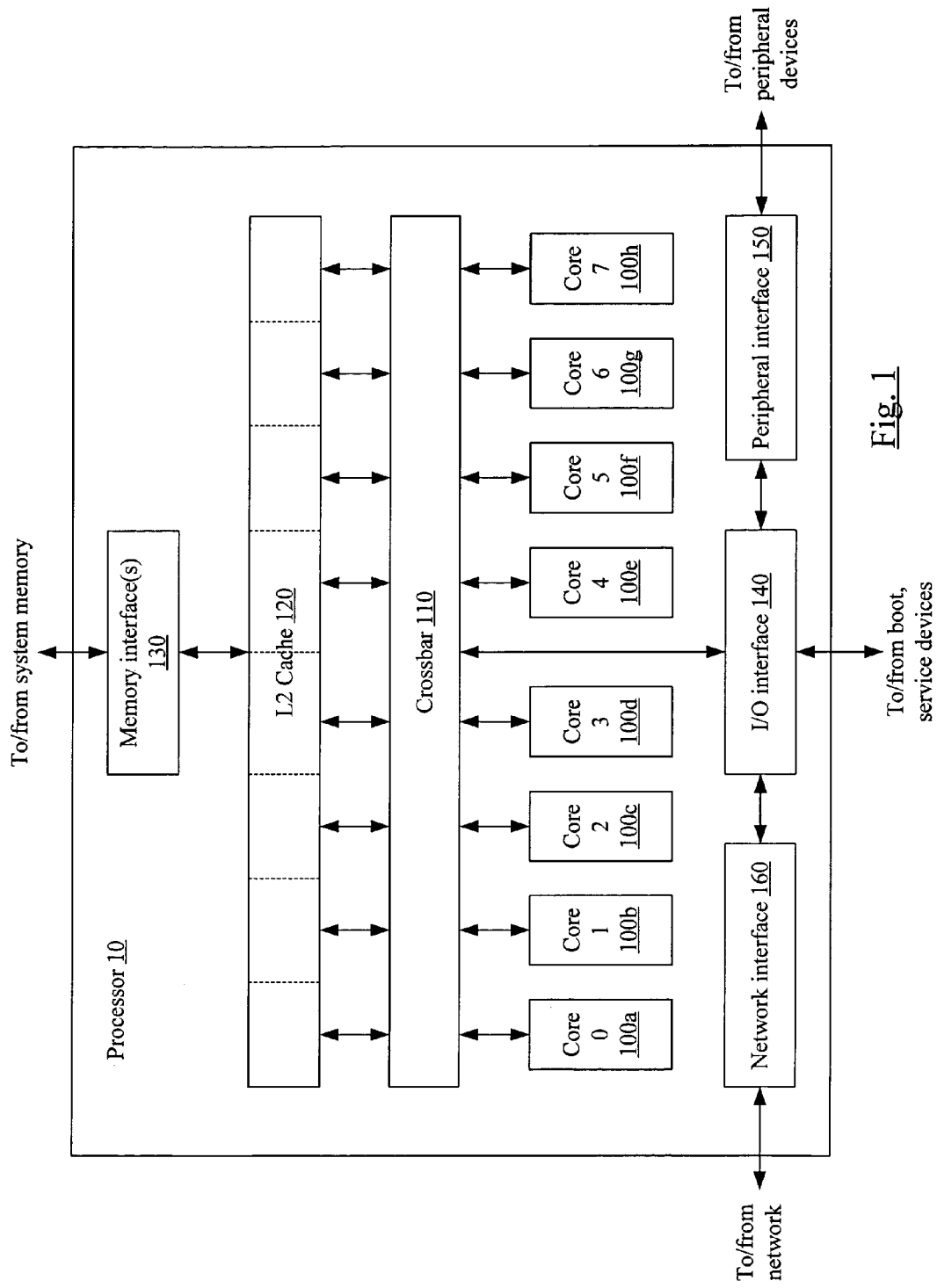
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Figure 2:
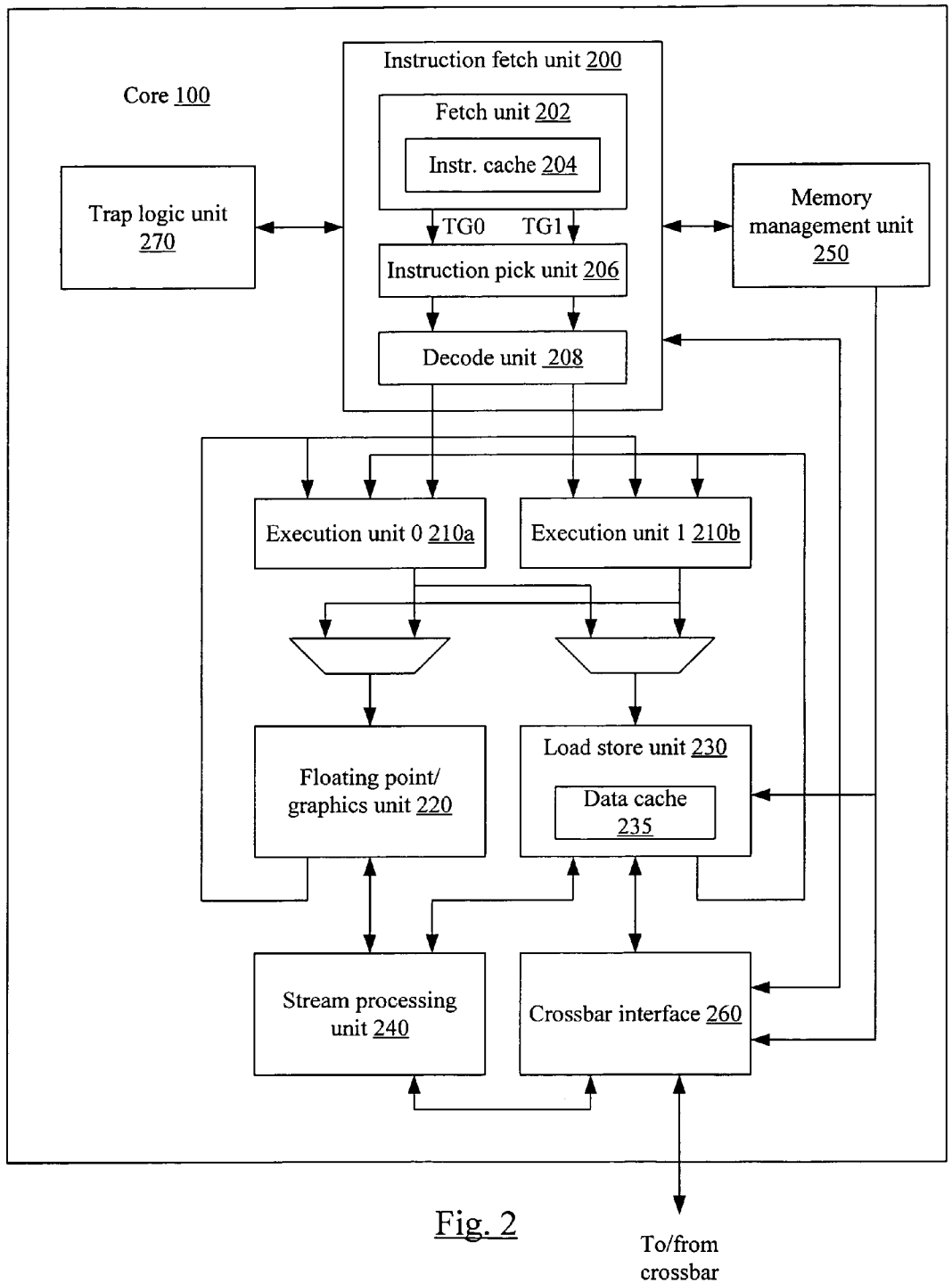
FIG. 2 is a block diagram of one embodiment of a core shown in FIG. 1.

FIGS. 1–3 present an overview of a multithreaded processor 10 that may implement speculative fetching as described in more detail below. In other embodiments, the processor may be implement other multithreaded configurations.

A block diagram illustrating one embodiment of a multithreaded processor 10 is shown in FIG. 1. In the illustrated embodiment, processor 10 includes a plurality of processor cores 100a–h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a–b. (Execution units 210a–b may also be referred to generically as EXUs 210.) Each of execution units 210a–b is coupled to both a floating point/graphics unit (FGU) 220 and a load store unit (LSU) 230. Each of the latter units is also coupled to send data back to each of execution units 210a–b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 204 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a–b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0–7 where threads 0–3 are bound to TG0 and threads 4–7 are bound to TG1, EXU0 210a may store integer register state for each of threads 0–3 while EXU1 210b may store integer register state for each of threads 4–7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS™) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Speculative Fetching

The processor 10 may include a fetch generator circuit configured to generate fetch requests to the instruction cache to fetch instructions from threads for execution. For example, in the present embodiment, each core 100 may include a fetch generator circuit and an instruction cache 204 from which instructions from the threads being executed by that core 100 may be fetched. In other embodiments, a processor 10 may comprise a single core 100 rather than multiple cores as shown in FIG. 1.

Figure 4:
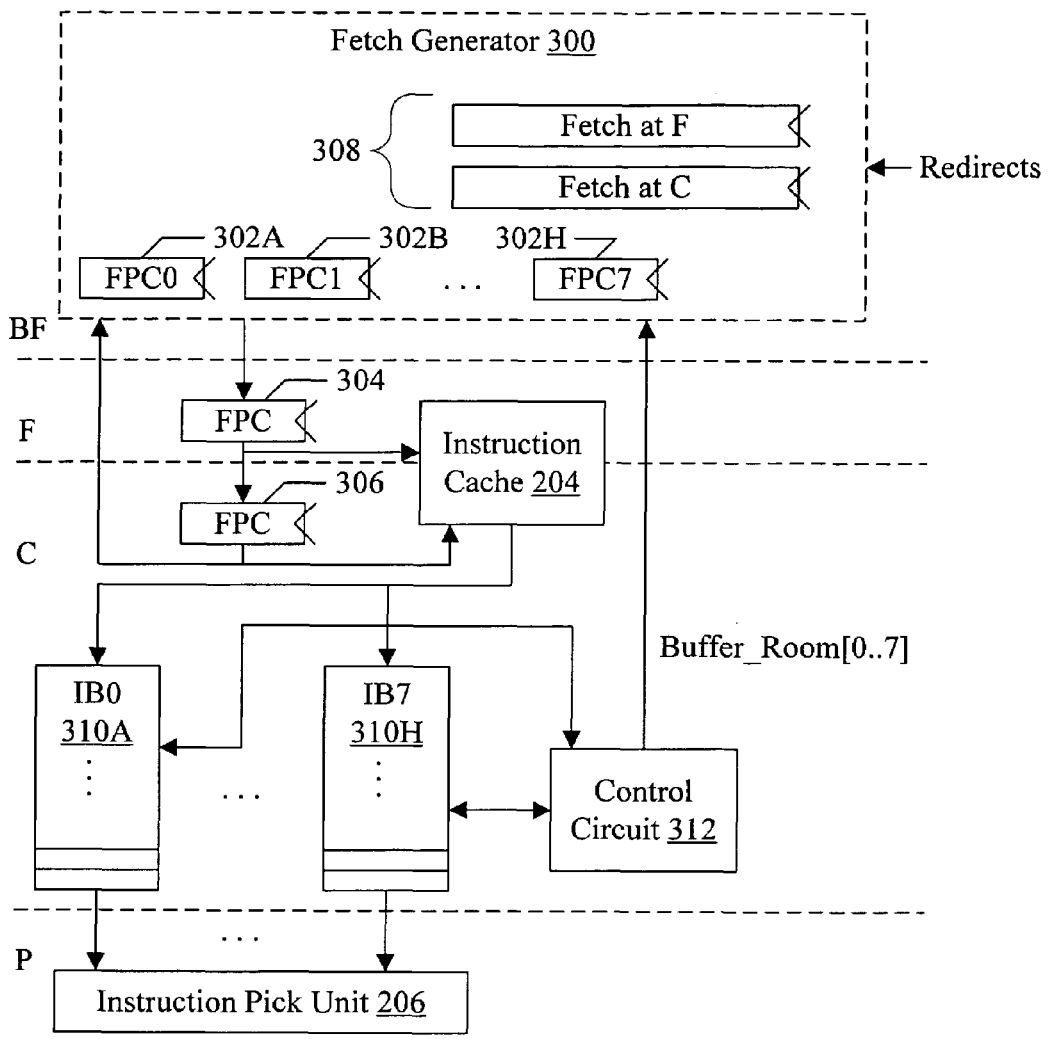
FIG. 4 is a block diagram illustrating a portion of one embodiment of a core shown in FIG. 2.

FIG. 4 is a block diagram of a portion of one embodiment of the core 100. Also shown in FIG. 4 are exemplary pipeline stages at which the portions shown in FIG. 4 may be operable, for one embodiment, although the pipeline stages may differ in other embodiments. Generally, a circuit may be operable at a given pipeline stage if, for a given instruction, the circuit operates on the instruction when the instruction is in that given pipeline stage. In the embodiment of FIG. 4, a fetch generator circuit 300 is shown, which includes a set of storage devices 302A–302H. Each storage device stores a fetch program counter (PC) corresponding to one of the threads that may be concurrently in execution in the core 100. Generally, any sort of storage device may be used (e.g. flops, registers, latches, a memory array, etc.). Additionally, one or more storage devices 308 are included in the fetch generator circuit 300, to store state related to fetch requests at the fetch and cache stages, in one embodiment. Other embodiments may pipeline the state from storage devices 308 to the fetch and cache stages, and the fetch generator circuit 300 may be coupled to receive the state from the stages. Storage devices 304 and 306 are included at the fetch and cache stages, respectively. The storage device 304 is coupled to receive a fetch PC from the fetch generator circuit 300, and the storage device 306 is coupled to receive a fetch PC from the storage device 304. The fetch PC at the fetch stage is provided to the instruction cache 204 to access the instruction cache memory. The fetch PC at the cache stage is provided to the instruction cache 204 to detect hit/miss in the instruction cache 204. Additionally, the storage device 306 is coupled to provide the fetch PC back to the fetch generator circuit 300. This path may be used, e.g., for a cache miss, a TLB miss, or a fetch error (such as a parity error on the instruction cache 204). Additionally, this path may be used to reset the fetch PC of a thread for a speculative fetch that did not succeed (described in more detail below). A plurality of instruction buffers 310A–310H are also shown, coupled to receive instructions from the instruction cache 204 and also coupled to a control circuit 312 and the instruction pick unit 206. The control circuit 312 is further coupled to provide a set of buffer room signals (Buffer_Room[0 . . . 7] in FIG. 4) to the fetch generator circuit 300.

The pipeline in the embodiment of FIG. 4 includes a before fetch (BF) stage, in addition to the F, C, and P stages similar to the pipeline shown in FIG. 3. In the BF stage, one of the threads is picked to fetch from the instruction cache 204. During the F stage, the instruction cache 204 is accessed (along with the instruction TLB, if applicable) and cache hit/miss is determined in the C stage. In other embodiments, the pipeline of FIG. 3 may be used and the selection of threads may occur in the F stage.

The fetch generator circuit 300 is operable at the BF stage in the illustrated embodiment, and maintains a fetch PC (FPC) for each thread in the storage devices 302A–302H, as mentioned above. In a given clock cycle, the fetch generator circuit may select one of the threads to be fetched for each port on the instruction cache 204. For example, in one embodiment, the instruction cache 204 may have a single port and the fetch generator circuit 300 may select one of the threads. Other embodiments may include more than one port, and the fetch generator circuit may select a thread to fetch on each port. The single ported embodiment will be described in more detail below, but the discussion applies to multi-ported embodiments as well.

The fetch generator circuit 300 may monitor for various conditions that may cause a fetch for a given thread to be inhibited. Any set of conditions may be defined in various embodiments. In some embodiments, the conditions may be defined to inhibit a fetch for a thread if the fetch is not likely to be successful in delivering instructions for execution. For example, if a previous fetch request for the thread missed in the instruction cache 204 or in the ITLB (if translation is implemented), then additional fetches for the thread may be inhibited until the previous fetch is completed (e.g. by fetching the missing cache line in to the instruction cache

204, by loading the missing translation into the ITLB, etc.). Other conditions may include, e.g., that a fetch address is not currently available for the thread (e.g. due to a trap). Another condition that may inhibit fetching is a lack of storage locations to buffer the fetched instructions to await execution scheduling (e.g. in the instruction buffer 310A–310H corresponding to the thread).

If at least one thread has no conditions that inhibit its fetch, the fetch generator circuit 300 may select that thread to fetch from the instruction cache and may generate a fetch request to the instruction cache 204 for that thread. As used herein, a fetch request may comprise any request presented to an instruction cache or other fetch circuitry to fetch instructions. The request may generally include the address from which the instructions are to be fetched (also referred to as a program counter, or PC) and may include any other desired information in various embodiments (e.g. thread identifier). In one implementation, up to four instructions may be fetched in response to a given fetch request.

On the other hand, in some cases, at least one condition that inhibits a fetch may be detected for each thread. The fetch generator circuit 300, in such cases, may generate a speculative fetch request if at least one thread is inhibited from fetching due to only a predetermined one of the conditions monitored by the fetch generator circuit 300. That is, none of the other conditions except for the predetermined condition apply to the thread. In one embodiment, the predetermined condition is that the receiving instruction buffer 310A–310H does not have enough free storage locations available to store the fetched instructions (also referred to as having enough room to store the fetched instructions). While the instruction buffer may not have enough room to store instructions that would be fetched for a given thread at the time the fetch generator circuit 300 is generating the fetch request, if the instructions were fetched and transmitted to the instruction buffer it is possible that the instruction buffer 310A–310H would have room to store the instructions when the instructions are provided to the instruction buffer 310A–310H. For example, if one or more instructions are issued for execution by the instruction pick unit 206, the instructions are deleted from the instruction buffer 310A–310H. In some embodiments, there may be one or more pipeline stages between the generation of a fetch request and the delivery of instructions to the instruction buffer, and thus one or more instructions may be issued for execution before the fetched instructions are provided for storage.

In the illustrated embodiment, the control circuit 312 provides an indication for each thread of how much room is available in the corresponding instruction buffer 310A–310H for storing newly-fetched instructions. For example, the Buffer_Room signal for each thread may be provided as shown in FIG. 4. The signal may be asserted to indicate if the instruction buffer corresponding to the thread has room to store fetched instructions and deasserted if the buffer does not have room. Such a signal may be based on a threshold number of free storage locations in the instruction buffer. For example, if up to 4 instructions may be fetched in response to a fetch request, the threshold number may be four. In other embodiments, the indication may have other forms. For example, a count of the number of instructions that the instruction buffer is able to receive and store may be provided.

The fetch generator circuit 300 may not only consider the amount of space available in the instruction buffer 310A–310H corresponding to a given thread, as indicated by the indications from the control circuit 312, but may also consider any fetch requests that are "in-flight" for the thread to determine the condition of whether or not the instruction buffer has room for the instructions, in one embodiment. A fetch request is "in flight" if it has been generated by the fetch generator circuit 300 but not completed (e.g. by writing instructions to the instruction buffer 310A–310H). That is, if a fetch request is in flight in the illustrated embodiment, the fetch generator circuit 300 may include the instructions being fetched in determining if the instruction buffer has room. In some embodiments, if a fetch request is in flight for a thread, the fetch generator circuit 300 may or may not generate a speculative fetch request based on the indications from the control circuit 312.

The fetch generator circuit 300, in the illustrated embodiment, tracks the fetch requests at the fetch and cache stages in the storage devices 308 for use in determining if threads are inhibited from fetching. Additionally, in some embodiments, the fetch generator circuit 300 may track whether or not the fetch request is speculative. In some embodiments, the fetch generator circuit 300 may not generate a second speculative fetch request for a thread if there is already a speculative fetch request for that thread in flight.

In addition to generating a fetch request for the selected thread, the fetch generator circuit 300 may generally maintain the fetch PCs for each thread in the storage devices 302A–302H. For example, if a fetch request is generated for a thread (either speculatively or not), the fetch generator 300 may update the fetch PC for that thread to reflect the fetch (e.g. incrementing the fetch PC to indicate the next instruction to be fetched). The fetch generator circuit 300 may further update a fetch PC to reset the fetch PC to the fetch PC returned from the storage device 306 (e.g. in response to an instruction cache miss, ITLB miss, fetch error, or speculative fetch that did not result in storing the instructions in the instruction buffer 310A–310H of the corresponding thread). Other sources of redirects may also cause an update of a fetch PC for a thread (shown as the "redirects" input to the fetch address generator circuit 300 in FIG. 4). For example, branch taken redirects may be received from the execution units 210A–210B and other redirects (e.g. traps, load misses in the data cache, etc.) may be provided by the trap logic unit 270.

As used herein, the PC of an instruction may be any representation of the address at which the instruction is stored. The PC may be a virtual address or a physical address, in various embodiments. The PC may also be a partial address. For example, in fixed-length instruction sets, one or more of the least significant bits of the PC may be known to be zero and may not be stored (except where visible to software, in which case the PC is stored in the format defined in the ISA). Additionally, in some cases, it may be possible to represent the PC using part of the address (e.g. the in-page portion of the address while storing the remainder of the address elsewhere, etc.).

Generally, each of the instruction buffers 310A–310H corresponds to a respective thread of the plurality of threads that may be concurrently under execution in the core 100, and stores instructions fetched from the respective thread that are waiting to be scheduled for execution. Each instruction buffer 310A–310H comprises a plurality of storage locations, or entries, each configured to store an instruction and optionally any related state that may be used by the instruction pick unit 206 or execution units that execute the instructions. Any number of entries may be provided (e.g. 8 entries, in some embodiments). The instruction buffer 310A–310H may be any type of memory or other storage device. In one particular embodiment, each instruction buffer 308A–308H may comprise a single register storing entry 0 of the buffer (the oldest instruction in the buffer) and a memory array storing the remaining entries (with pointers indicating the oldest and youngest instructions in the memory array). As instructions are successfully issued for execution, the next instruction in program order may be read from the memory array and shifted into the register.

As mentioned above, a thread may comprise a set of instructions that execute independently of the instructions from another thread. In some embodiments, the core 100 may maintain separate state for each thread. For example, the register state for each thread may be separate from other threads. That is, the core 100 may access and update separate register state for each thread.

Figure 5:
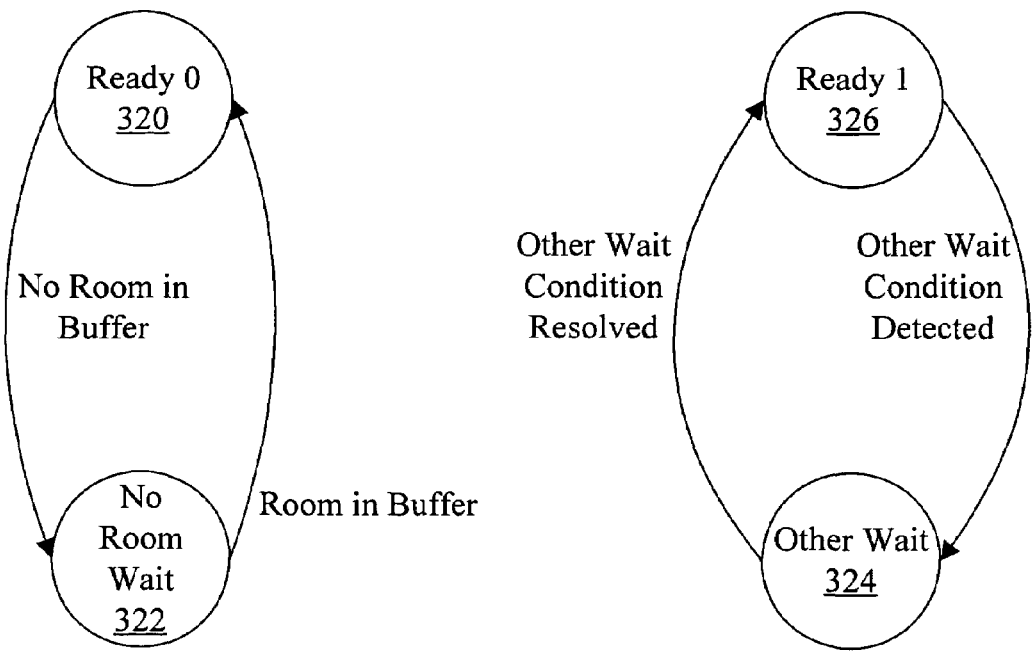
FIG. 5 is a diagram illustrating an exemplary pair of state machines that may be implemented by one embodiment of a fetch generator circuit shown in FIG. 4.

Turning next to FIG. 5, one embodiment of a pair of state machines that may be implemented for a thread in the fetch generator circuit 300 is shown. The fetch generator circuit 300 may implement independent instances of the state machines shown in FIG. 5 for each thread. In the illustrated embodiment, one state machine (on the left in FIG. 5) includes a ready0 state 320 and a no room wait state 322. The other state machine (on the right in FIG. 5) includes a ready1 state 326 and an other wait state 324. The respective ready states 320 and 326 may indicate that the thread is ready to be selected for fetching (non-speculatively) with respect to the condition or conditions being tracked using that state machine. Thus, a thread may be ready for non-speculative fetch if both state machines are in the respective ready states 320 and 326, as illustrated by the "Ready" equation shown in FIG. 5. For the illustrated embodiment, the "Speculative_Ready" equation shown in FIG. 5 indicates when the thread is ready for speculative fetch (e.g. ready1 state 326 and not ready0 state 320). The various wait states such as the no room wait state 322 and the other wait state 324 indicate that the thread is not ready to be selected. Generally, when either of the state machines is in a given state, it remains in that state until one of the transitions out of that state is detected.

If the state machine on the left in FIG. 5 is in the ready state 320 and the fetch generator circuit 300 detects that there is no room in the buffer for additional fetched instructions, the state machine transitions to the no room wait state 322. The fetch generator circuit 300 may determine that there is no room in the buffer based on the corresponding indication for the thread from the control circuit 312 and, in some embodiments, based on the fetch requests that are in flight for the thread. If the state machine is in the no room wait state 322 and the corresponding instruction buffer 310A–310H has room, the state machine transitions to the ready state 320.

The other wait state 324 may correspond to any other wait conditions that may be implemented for a thread (e.g. instruction cache miss, ITLB miss or trap, etc.). In some embodiments, each condition may have its own state (and/or state machine) and thus the other wait state 324 may represent multiple states and/or the state machine on the right in FIG. 5 may represent multiple state machines. If the state machine on the right is in the ready1 state 326 and one or more of the other wait conditions is detected, the state machine transitions to the other wait state 324. If the state machine is in the other wait state 324 and the other wait condition (or conditions) is (are) resolved, the state machine transitions to the ready1 state 326.

It is noted that, in other embodiments, a single state machine may be implemented to represent the operation of the state machines shown in FIG. 5.

Figure 6:
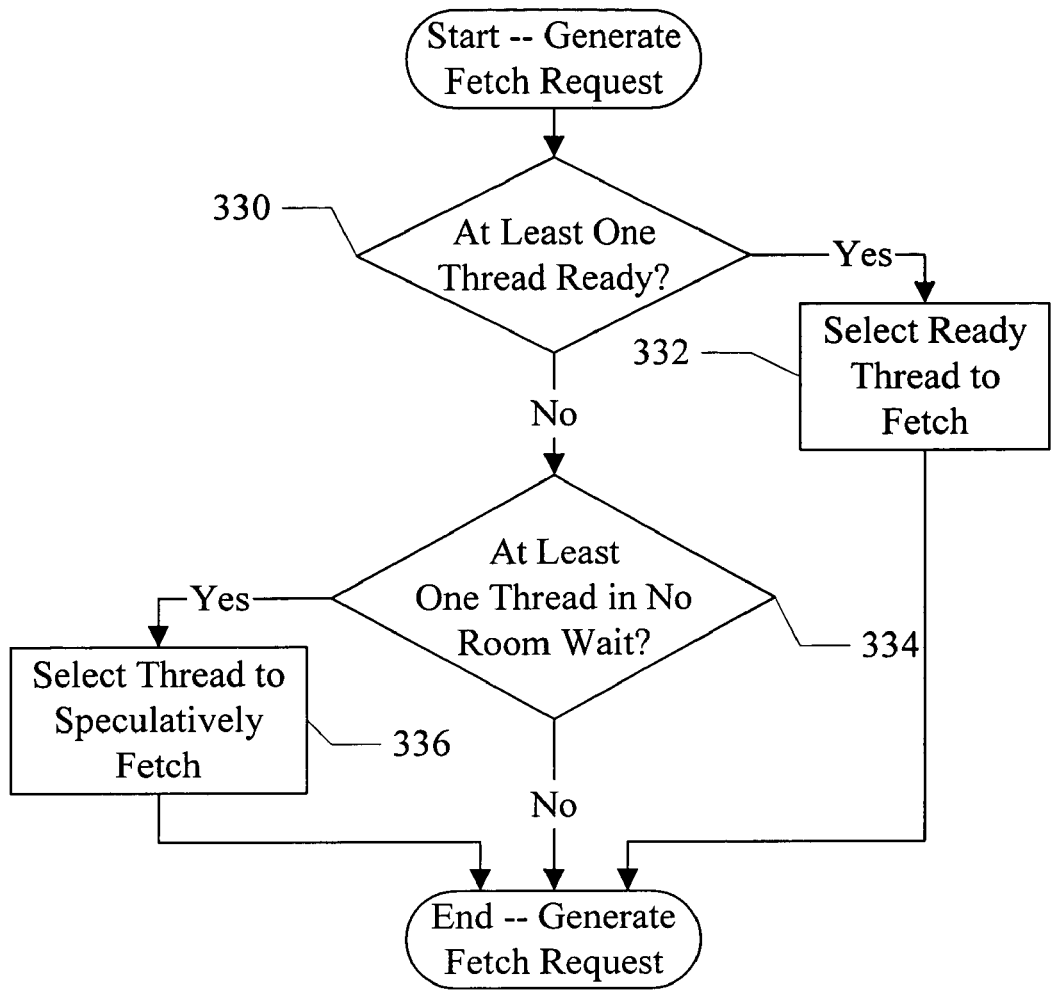
FIG. 6 is a flowchart illustrating operation of one embodiment of a fetch generator circuit generating a fetch request.

FIG. 6 is a flowchart illustrating operation of one embodiment of the fetch generator circuit 300 for generating a fetch request. The fetch generator circuit 300 may include circuitry implementing the operation shown in FIG. 6. In some cases, blocks shown in a particular order in FIG. 6 may be performed in parallel by combinatorial logic circuitry in the fetch generator circuit 300. In other cases, blocks (or the operation of the flowchart as a whole) may be pipelined over multiple clock cycles, if desired.

The fetch generator circuit 300 may determine if at least one thread is ready to fetch (decision block 330). For example, in embodiments implementing the state machines shown in FIG. 5, a thread is ready if its corresponding state machines are in the ready0 state 320 and ready1 state 326. That is, a thread may be ready if its Ready equation, as shown in FIG. 5, evaluates to a binary one. If at least one thread is ready to fetch (decision block 330, "yes" leg), the fetch generator circuit 300 may select a ready thread to fetch and may generate a fetch request for the selected thread (block 332). If more than one ready thread is detected, the fetch generator circuit 300 may use any mechanism to select one of the ready threads. In one embodiment, for example, a least recently fetched mechanism may be used to select the ready thread that is least recent among the ready threads to be fetched. In one particular embodiment, a hierarchical least recently fetched mechanism may be used in which least recently fetched thread information is maintained for each thread group, and the least recently fetched thread group is also tracked. The least recently fetched thread in the least recently fetched thread group may be selected.

On the other hand, if no thread is ready to be fetched (decision block 330, "no" leg), the fetch generator circuit 300 may generate a speculative fetch request. If at least one thread is ready for speculative fetch (decision block 334, "yes" leg), then the fetch generator circuit 300 may select a thread to speculatively fetch and may generate a fetch request for the selected thread (block 336). In one embodiment, a thread may be ready for speculative fetch if it is waiting only for room in the corresponding instruction buffer 310A–310H. That is, a thread may be ready for speculative fetch, in some embodiments, if its Speculative_Ready equation (see FIG. 5) evaluates to a binary one. If more than one thread may be selected for a speculative fetch, the least recently fetched mechanism may be used similar to the above discussion. In various embodiments, if a speculative fetch is generated for the thread, the least recently fetched state may or may not be changed to indicate that the speculatively selected thread has been fetched, as desired. If no thread is ready for speculative fetch (decision block 334, "no" leg), then no fetch request may be generated for the clock cycle.

Figure 7:
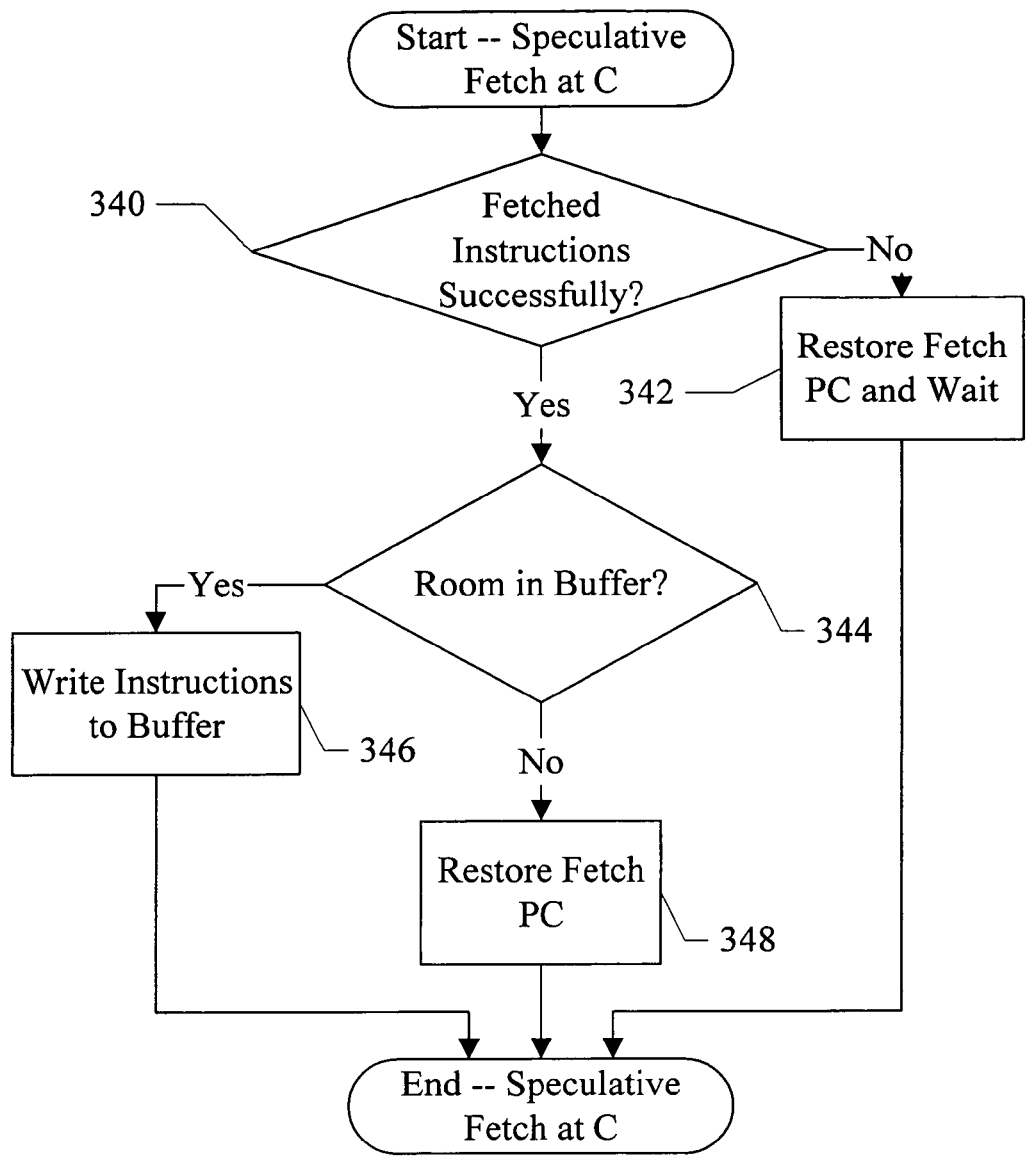
FIG. 7 is a flowchart illustrating operation of one embodiment of a fetch generator circuit when a speculative fetch arrives at a cache stage.

FIG. 7 is a flowchart illustrating operation of one embodiment of the fetch generator circuit 300 when a speculative fetch request reaches the cache stage (or, in other embodiments, the stage at which the instructions fetched in response to the fetch request would be written to the instruction buffer 310A–310H corresponding to the thread). The fetch generator circuit 300 may include circuitry implementing the operation shown in FIG. 7. In some cases, blocks shown in a particular order in FIG. 7 may be performed in parallel by combinatorial logic circuitry in the fetch generator circuit 300. In other cases, blocks (or the operation of the flowchart as a whole) may be pipelined over multiple clock cycles, if desired.

The fetch generator circuit 300 may determine if instructions were successfully fetched for the fetch request (decision block 340). Various events may cause the fetch request to be unsuccessful at fetching instructions (e.g. instruction cache miss, ITLB miss or exception, fetch error, etc.). If instructions were not successfully fetched (decision block 340, "no" leg), the fetch generator circuit 300 may restore the fetch PC to the PC provided from the storage device 306 and the thread's state machine may transition to the other wait state 324 (block 342).

On the other hand, if instructions were successfully fetched, the fetch generator circuit 300 may determine if there is room in the instruction buffer for the instructions (decision block 344). If there is room (decision block 344, "yes" leg), the instructions are written to the instruction buffer and fetching continues (block 346). If there is no room in the buffer (decision block 344, "no" leg), the fetch generator circuit 300 restores the fetch PC for the thread to the PC from the storage device 306 and the instructions are not written to the instruction buffer (block 348). In some embodiments, if at least one of the fetched instructions cannot be stored in the buffer, then the fetch generator circuit 300 determines that the speculative fetch request is unsuccessful and none of the instructions are stored in the instruction buffer. In other embodiments, if one or more instructions may be stored in the instruction buffer but not all of the fetched instructions, the instructions that may be stored are written to the instruction buffer and the fetch PC for the thread may be restored to a PC that reflects the fetching of the instructions that were written to the instruction buffer.

Exemplary System Embodiment

Figure 8:
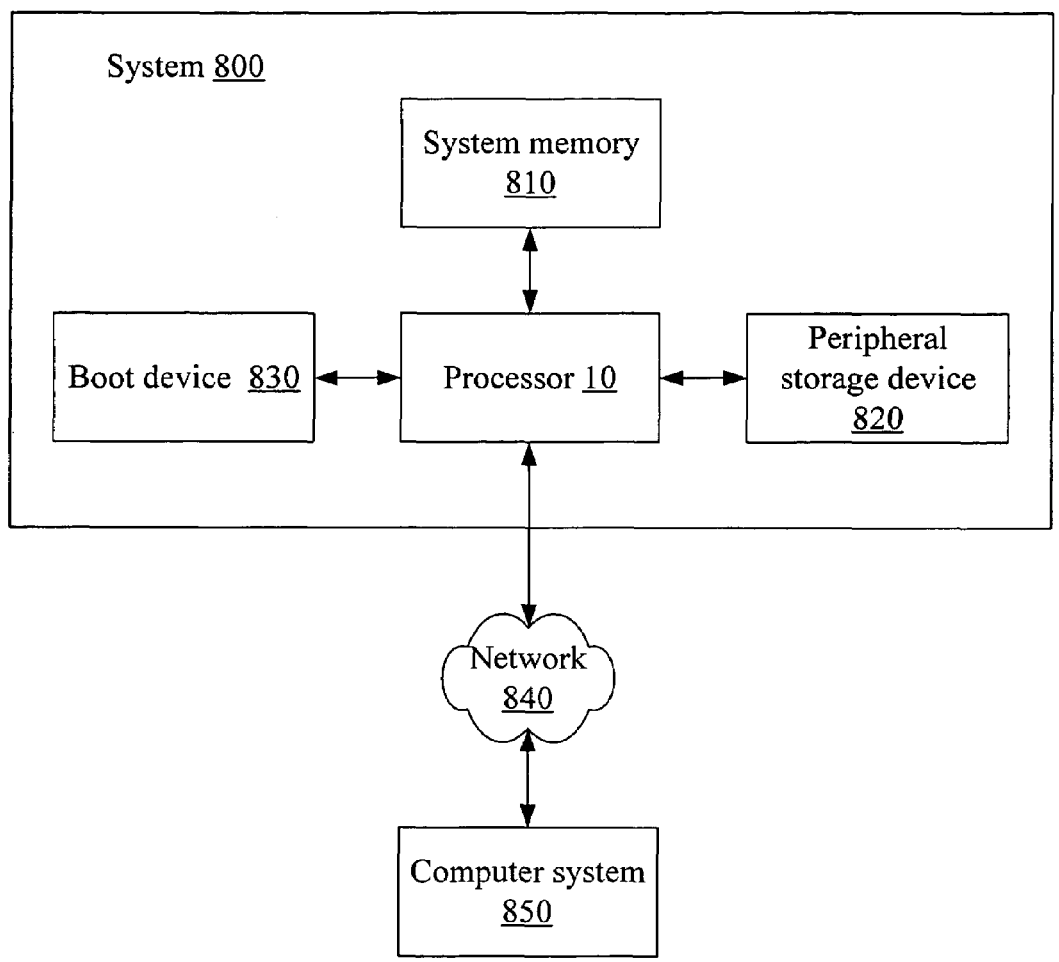
FIG. 8 is a block diagram of one embodiment of a computer system including the processor shown in FIG. 1.

As described above, in some embodiments processor 10 of FIG. 1 may be configured to interface with a number of external devices. One embodiment of a system including processor 10 is illustrated in FIG. 8. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Numerous variations and modifications will become apparent to those skilled in the art once the above disclosure is fully appreciated. It is intended that the following claims be interpreted to embrace all such variations and modifications.

What is claimed is:

1. A processor comprising:
a plurality of instruction buffers, each of the plurality of instruction buffers corresponding to a respective thread of a plurality of threads; and
a fetch generator circuit configured to generate at least a first fetch request to fetch at least one instruction from a first thread of the plurality of threads for storage in a first instruction buffer of the plurality of instruction buffers corresponding to the first thread, the fetch generator circuit configured to speculatively generate the first fetch request responsive to: (i) the fetch generator circuit detecting at least one condition for each thread of the plurality of threads that is defined to inhibit the thread from being fetched; and (ii) the first thread being selectable to be fetched except for the condition that the first instruction buffer of the plurality of instruction buffers is unable, in a clock cycle in which the first fetch request is generated, to store at least one instruction to be fetched in response to the first fetch request, and wherein the fetch generator circuit is configured to maintain a plurality of fetch program counters (PCs), each of the plurality of fetch PCs corresponding to a respective thread of the plurality of threads, and wherein the first fetch request comprises a first fetch PC of the plurality of fetch PCs that corresponds to the first thread.

2. The processor as recited in claim 1 wherein the first instruction buffer is coupled to receive the at least one instruction fetched in response to the first fetch request in a second clock cycle, and wherein, if the first instruction buffer is able to store the at least one instruction fetched in response to the first fetch request, the first instruction buffer is configured to store the instruction.

3. The processor as recited in claim 2 wherein, if the first instruction buffer is unable to store at least one of the instructions fetched in response to the first fetch request in the second clock cycle, the fetch generator circuit is configured to reset the first fetch request for the first thread.

4. The processor as recited in claim 1 further comprising a control circuit coupled to the plurality of instruction buffers, wherein the control circuit is configured to generate a plurality of indications, each of the plurality of indications corresponding to a respective instruction buffer of the plurality of instruction buffers and indicative of a number of instructions that the respective instruction buffer is able to receive, and wherein the fetch generator circuit is coupled to receive the plurality of indications and to use a first indication of the plurality of indications corresponding to the first instruction buffer in detecting that the first instruction buffer is unable to store the at least one instruction to be fetched in response to the first fetch request.

5. The processor as recited in claim 1 wherein the fetch generator circuit is operable at a first pipeline stage and wherein the instructions are provided to the plurality of instruction buffers for storage at a second pipeline stage, and wherein at least one pipeline stage exists between the first pipeline stage and the second pipeline stage in the pipeline.

6. The processor as recited in claim 5 further comprising an instruction cache, wherein the first fetch request accesses the instruction cache in the at least one pipeline stage.

7. The processor as recited in claim 1 further comprising an instruction pick unit coupled to the plurality of instruction buffers, wherein the instruction pick unit is configured to select a stored instruction from one of the plurality of instruction buffers to issue for execution, and wherein the stored instruction is deleted from the one of the plurality of instruction buffers responsive to being issued.

8. A method comprising:
in a first clock cycle, detecting at least one condition for each thread of a plurality of threads that is defined to inhibit the thread from being fetched, wherein a first thread of the plurality of threads is selectable to be fetched except for the condition that a first instruction buffer of a plurality of instruction buffers is unable, in the first clock cycle, to store at least one instruction to be fetched from the first thread, wherein each of the plurality of instruction buffers corresponds to a respective thread of the plurality of threads and the first instruction buffer corresponds to the first thread;
speculatively generating a first fetch request to fetch at least one instruction from the first thread of the plurality of threads for storage in the first instruction buffer responsive to detecting the at least one condition for each thread and that the first thread is selectable to be fetched except for the condition that the first instruction buffer is unable to store the at least one instruction; and
maintaining a plurality of fetch program counters (PCs), each of the plurality of fetch PCs corresponding to a respective thread of the plurality of threads, and wherein the first fetch request comprises a first fetch PC of the plurality of fetch PCs that corresponds to the first thread.

9. The method as recited in claim 8 further comprising:
in a second clock cycle, the first instruction buffer receiving the at least one instruction fetched in response to the first fetch request; and
the first instruction buffer storing the at least one instruction fetched in response to the first fetch request if the first instruction buffer is able to store the instruction in the second clock cycle.

10. The method as recited in claim 9 further comprising, if the first instruction buffer is unable to store at least one of the instructions fetched in response to the first fetch request in the second clock cycle, resetting the first fetch request for the first thread.

11. The method as recited in claim 8 further comprising:
generating a plurality of indications, each of the plurality of indications corresponding to a respective instruction buffer of the plurality of instruction buffers and indicative of a number of instructions that the respective instruction buffer is able to receive; and
using a first indication of the plurality of indications corresponding to the first instruction buffer in detecting that the first instruction buffer is unable to store the at least one instruction to be fetched in response to the first fetch request.

12. The method as recited in claim 8 wherein a fetch generator circuit that performs the speculative generating is operable at a first pipeline stage and wherein the instructions are provided to the plurality of instruction buffers for storage at a second pipeline stage, and wherein at least one pipeline stage exists between the first pipeline stage and the second pipeline stage in the pipeline.

13. The method as recited in claim 12 further comprising accessing an instruction cache with the first fetch request in the at least one pipeline stage.

14. The method as recited in claim 8 further comprising:
issuing a stored instruction from one of the plurality of instruction buffers for execution; and
deleting the stored instruction from the one of the plurality of instruction buffers responsive to issuing the stored instruction.

15. A processor comprising:
an instruction cache; and
a fetch generator circuit coupled to the instruction cache and configured to generate at least one fetch request to the instruction cache for at least one of a plurality of threads, wherein the fetch generator circuit is configured to monitor for a plurality of conditions for each thread, each of the plurality of conditions defined to inhibit the thread from being fetched, and wherein the fetch generator circuit is configured to speculatively generate a first fetch request for a first thread of the plurality of threads if each thread is inhibited from fetching and the first thread is inhibited from fetching only due to a first predetermined condition of the plurality of conditions, and wherein the fetch generator circuit is configured to maintain a plurality of fetch program counters (PCs), each of the plurality of fetch PCs corresponding to a respective thread of the plurality of threads, and wherein the first fetch request comprises a first fetch PC of the plurality of fetch PCs that corresponds to the first thread.

16. The processor as recited in claim 15 further comprising a plurality of instruction buffers, each of the plurality of instruction buffers corresponding to a respective thread of a plurality of threads, wherein the first predetermined condition is that a first instruction buffer of the plurality of instruction buffers that corresponds to the first thread is unable, at a time that the first fetch request is generated, to store at least one instruction to be fetched in response to the first fetch request.

17. The processor as recited in claim 16 wherein one or more instructions fetched in response to the first fetch request are provided to the first instruction buffer and, if the first instruction buffer is able to store the one or more instructions at a time that the one or more instructions are received by the first instruction buffer, the first instruction buffer is configured to store the one or more instructions.

18. The processor as recited in claim 17 wherein, if the first instruction buffer is unable to store at least one of the one or more instructions, the fetch generator circuit is configured to reset the first fetch request for the first thread.

19. The processor as recited in claim 16 further comprising a control circuit coupled to the plurality of instruction buffers, wherein the control circuit is configured to generate a plurality of indications, each of the plurality of indications corresponding to a respective instruction buffer of the plurality of instruction buffers and indicative of a number of instructions that the respective instruction buffer is able to receive, and wherein the fetch generator circuit is coupled to receive the plurality of indications and to use a first indication of the plurality of indications corresponding to the first instruction buffer in detecting that the first instruction buffer is unable to store the at least one instruction to be fetched in response to the first fetch request.

20. The processor as recited in claim 16 wherein the fetch generator circuit is operable at a first pipeline stage and wherein the instructions are provided to the plurality of instruction buffers for storage at a second pipeline stage, and wherein at least one pipeline stage exists between the first pipeline stage and the second pipeline stage in the pipeline.

21. The processor as recited in claim 20 wherein the first fetch request accesses the instruction cache in the at least one pipeline stage.

* * * * *